US009009030B2

(12) United States Patent
Wang et al.

(10) Patent No.: US 9,009,030 B2
(45) Date of Patent: Apr. 14, 2015

(54) METHOD AND SYSTEM FOR FACILITATING TEXT INPUT (75) Inventors: Yonggang Wang, Beijing (CN); Xiangye Xiao, Beijing (CN); Junyu Wang, Beijing (CN); Jian Zeng, Beijing (CN); Pan Jie, Beijing (CN); George Zhang, Beijing (CN); Annie Chang, Shanghai (CN); Hanping Feng, Mountain View, CA (US); Henry Ou, Beijing (CN)

(73) Assignee: Google Inc., Mountain View, CA (US)

( * ) Notice: Subject to any disclaimer, the term of this patent is extended or adjusted under 35 U.S.C. 154(b) by 122 days.

(21) Appl. No.: 13/142,898

(22) PCT Filed: Jan. 5, 2011

(86) PCT No.: PCT/CN2011/070044
§ 371 (c)(1),
(2), (4) Date: Jun. 30, 2011

(87) PCT Pub. No.: WO2012/092709
PCT Pub. Date: Jul. 12, 2012

(65) Prior Publication Data
US 2012/0173222 A1    Jul. 5, 2012

(51) Int. Cl.
G06F 17/27    (2006.01)
G06F 17/28    (2006.01)
(52) U.S. Cl.
CPC ............ *G06F 17/273* (2013.01); *G06F 17/276* (2013.01); *G06F 17/289* (2013.01)
(58) Field of Classification Search
USPC .......................................................... 704/2
See application file for complete search history.

(56) References Cited

U.S. PATENT DOCUMENTS

| 5,109,352 | A | * | 4/1992 | O'Dell ........................... 715/262 |
| 5,392,386 | A | * | 2/1995 | Chalas ........................... 715/841 |
| 5,635,932 | A | * | 6/1997 | Shinagawa et al. ............. 341/51 |
| 5,724,457 | A | * | 3/1998 | Fukushima ..................... 382/311 |

(Continued)

FOREIGN PATENT DOCUMENTS

| CN | 1581103 A | 2/2005 |
| CN | 101398835 A | 4/2009 |

(Continued)

OTHER PUBLICATIONS

"A New Statistical Approach to Chinese Pinyin Input" Zheng Chen, 2000, 38th Annual Meeting of the Association for Computational Linguistics.*

(Continued)

*Primary Examiner* — Jialong He
(74) *Attorney, Agent, or Firm* — Remarck Law Group PLC (57) ABSTRACT A method and system for facilitating text input is disclosed. The method comprises: invoking an input assistant from within an application in an operating environment at a client, the input assistant being a standalone input service within the same operating environment as the application, receiving a text string from a user in an input field of the application, providing, by the input assistant, input prediction for completing the text string, selecting an input text of at least one word in the input field of the application, retrieving, by the input assistant, text content related to the input text from one or more text assistance services in communication with the input assistant, presenting the received text content to the user for assistance in the user's text input.

18 Claims, 5 Drawing Sheets

(56) References Cited

U.S. PATENT DOCUMENTS

| | | | |
|---|---|---|---|
| 5,956,674 A * | 9/1999 | Smyth et al. | 704/200.1 |
| 6,073,146 A * | 6/2000 | Chen | 715/264 |
| 6,272,456 B1 * | 8/2001 | de Campos | 704/8 |
| 6,456,963 B1 * | 9/2002 | Araki | 704/200.1 |
| 7,107,204 B1 * | 9/2006 | Liu et al. | 704/2 |
| 7,613,603 B2 * | 11/2009 | Yamashita | 704/200.1 |
| 8,078,978 B2 * | 12/2011 | Perry et al. | 715/752 |
| 8,312,032 B2 | 11/2012 | Choi et al. | |
| 2003/0145285 A1 * | 7/2003 | Miyahira et al. | 715/533 |
| 2005/0209844 A1 * | 9/2005 | Wu et al. | 704/2 |
| 2005/0257134 A1 * | 11/2005 | Goodman et al. | 715/507 |
| 2006/0163337 A1 * | 7/2006 | Unruh | 235/145 A |
| 2006/0265648 A1 * | 11/2006 | Rainisto et al. | 715/534 |
| 2007/0050351 A1 | 3/2007 | Kasperski et al. | |
| 2008/0072143 A1 * | 3/2008 | Assadollahi | 715/261 |
| 2008/0109889 A1 * | 5/2008 | Bartels | 726/7 |
| 2008/0182599 A1 * | 7/2008 | Rainisto et al. | 455/466 |
| 2008/0281583 A1 * | 11/2008 | Slothouber et al. | 704/10 |
| 2009/0031240 A1 * | 1/2009 | Hildreth | 715/772 |
| 2009/0079813 A1 * | 3/2009 | Hildreth | 348/14.03 |
| 2009/0089282 A1 * | 4/2009 | Qi et al. | 707/5 |
| 2009/0198691 A1 * | 8/2009 | Kraft et al. | 707/6 |
| 2010/0010977 A1 * | 1/2010 | Choi et al. | 707/4 |
| 2010/0121876 A1 * | 5/2010 | Simpson et al. | 707/769 |
| 2010/0169770 A1 | 7/2010 | Hong et al. | |
| 2011/0035219 A1 * | 2/2011 | Kadirkamanathan et al. | 704/239 |
| 2011/0087961 A1 * | 4/2011 | Fitusi et al. | 715/261 |
| 2012/0029910 A1 * | 2/2012 | Medlock et al. | 704/9 |
| 2012/0035905 A1 * | 2/2012 | Brun | 704/2 |
| 2012/0072204 A1 * | 3/2012 | Nasri et al. | 704/9 |
| 2012/0078615 A1 * | 3/2012 | Sengupta | 704/9 |
| 2012/0191716 A1 * | 7/2012 | Omoigui | 707/740 |
| 2012/0197628 A1 * | 8/2012 | Best et al. | 704/2 |

FOREIGN PATENT DOCUMENTS

| | | |
|---|---|---|
| JP | H01100668 A | 4/1989 |
| JP | H11282833 A | 10/1999 |
| JP | 2001229156 A | 8/2001 |
| JP | 2010524137 A | 7/2010 |
| JP | 2011527801 A | 11/2011 |
| WO | 2009001812 A1 | 12/2008 |

OTHER PUBLICATIONS

PCT International Search Report and Written Opinion for PCT Application No. PCT/CN2011/070044 dated Oct. 27, 2011, 8 pgs.

Ochiai, T., "Useful for Anyone from Beginner Programmers to Advanced Users The world of the New Development Environment "REALbasic"", Nikkei MAC vol. 7, No. 9, Japan, Nikkei BP Company, Aug. 18, 1999, [ISSN] 0918-8894, pp. 120-127.

Prediction Candidate Mode—which Displays Multiple Prediction Candidates, [online], Japan, Just Systems Inc., Feb. 10, 2006, [search date Jul. 3, 2014], the Internet, URL: http://support.justsystems.com/faq/1032/app/servlet/qadoc?QID=028066, 2 pages.

Use Understood in 5 minutes! Clever ways of using ATOK, [online], U.S.A., Internet Archive, May 4, 2012, [search date Jul. 3, 2014], the Internet, URL: https://web.archive.org/web/20120504000420/http://atok.com/function/howto/, 7 pages.

* cited by examiner

METHOD AND SYSTEM FOR FACILITATING TEXT INPUT

BACKGROUND

This specification relates generally to text input, and more specifically, to facilitating text input for a user not conversant with the input language.

Figure 1A:
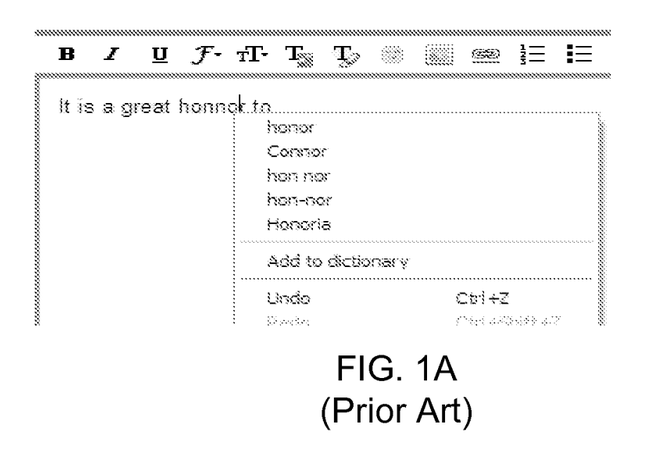
FIGS. 1A-1B are screenshots of existing features for facilitating text input inherent to particular applications.
Figure 1B:
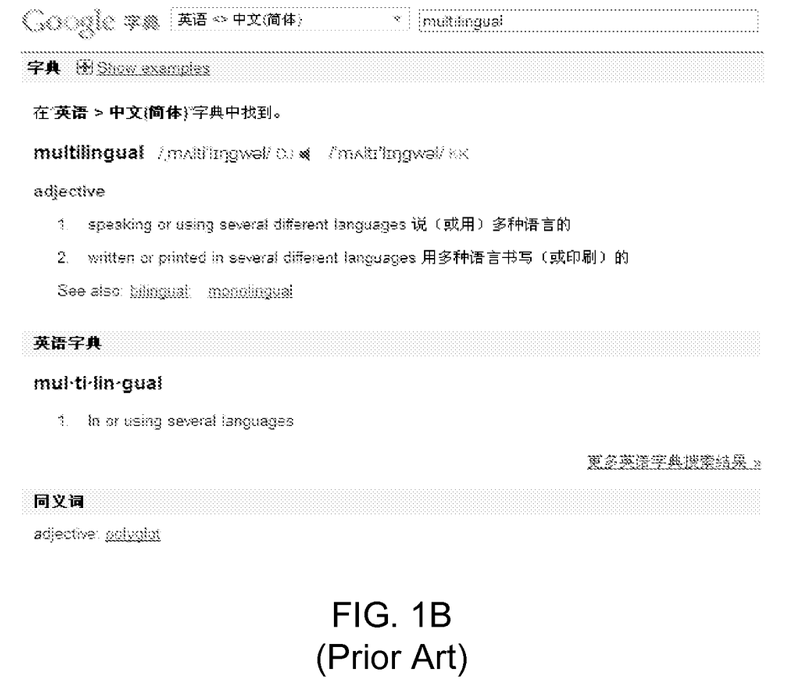

For some Latin languages, such as English, words are composed of alphabetic letters that are, when typing on a computer, keyed in one letter each time. There may be some errors in the text string input by a user, such as misspellings of a word, or grammatical mistakes, such as wrong tense, or other error. For a user inputting English text and whose native language is not English, for example, it may be necessary for the user to find additional resources, such as an online dictionary or a translation service, to determine a definition of a word or meaning of a sentence in the user's native language to ensure that the proper words or phrases are used when typing in English. In some cases, the service used may provide some text input assistance features, such as a spell checker, a thesaurus for finding synonyms or antonyms, prediction of the most likely form (e.g., spelling), etc., for a particular string. FIG. 1A is an example of a text editor that provides alternate and corrections for a text string "honor." The text editor is triggered by moving the cursor inside the string and a right click on the mouse. In this example, the user can select the word the user originally intended to type in the input field. FIG. 1B is an example of finding the meaning of a word "multilingual" in Google Dictionary, an online dictionary service provided by Google Inc.

In the above two examples, however, the input assistance features are either limited to a specific application, such as the text editor in FIG. 1A, or are a provided by separate service that the user has to invoke by following the interface provided by the service, such as in a separate application. Furthermore, the service(s) provided in each case may not be sufficient for a user to resort to when providing text input in a particular application.

On the other hand, for some non-Latin languages, such as the East Asian languages of Chinese, Korean or Japanese, it is not possible for a user to use a common keyboard to type in any characters in such languages directly since no characters or symbols of these languages are found on the keyboard. Various input methods are used to facilitate the input of text in these languages. This is achieved by implementing a so-called Input Method Editor (IME) in the operating system and invoking it in each application that may require text input from a user in an application. More than one IME can be installed on one computer for inputting text in different languages or the same language, and each can be used by a user according to his preference. An IME Framework (IMF) is the managing platform in the operating system that manages the different IME. The IMF exists in various modern operating systems, such as Microsoft Windows (IMM32 and Text Service Framework), Linux (scim and bus), Mac OSX and Android (IMF). Switching between the different IMEs in the operating system is managed by the IMF. However, aside from the function of providing indirect input of characters, most input methods provided for such Asian languages do not have many additional functions in assisting the user in his text input experience.

For a user who may often require input assistance when typing or writing in a non-native language, such as a user whose native language is Chinese and is typing in English in an input field of a particular application, it will be helpful if the user can resort to just one service for advanced runtime input assistance features without invoking multiple other services, regardless of what type of application is being used or interacted with.

SUMMARY

The systems and methods described herein aim to solve the above problem by providing an input assistant, implemented as IME, for invocation from any applications in an operating system environment and that offers advanced input assistance features so that a user may resort to this single service for multiple input assistance services.

In general, one innovative aspect of the subject matter described in this specification relates to a method for facilitating text input. The method includes the actions of invoking an input assistant from within an application in an operating environment at a client, the input assistant being a standalone input service within the same operating environment as the application and operable to be invoked from within a plurality of applications; receiving a text string from a user in an input field of the application; selecting an input text of at least a portion of one word in the input field of the application; selecting one or more text assistance services from at least two or more different text assistance services; receiving, by the input assistant, text content related to the input text from the one or more selected text assistance services in communication with the input assistant; and resenting the received text content at the client.

In another aspect, providing the input prediction may be performed after a predetermined time of inaction by the user since the input of the last character, and the input prediction may comprise a list of words or expressions ranked according to their relevance to the input string.

In yet another aspect, the items of the received text content may be presented in a menu within the application according to the respective ranking of relevance of each item to the selected input text, and when the user confirms a selection of an item in the menu, e.g., by pressing the space bar or the "return" key, the selected item may be committed to the input field to substitute the selected input text.

In one aspect, the text assistance services in communication with the input assistant may at least include: a dictionary service that provides meanings in a first language for a word or phrase in a second language; a spell checking service that detects erroneous spellings of a word in a language and provides its correct spelling in the same language; a translation service that provides text translation between at least two languages; a thesaurus service that provides synonyms and antonyms for a particular word in a language; an input history service that provides past expressions input by a particular user that are related to a target expression a grammar checker that checks the grammar of one or more input sentences; a template filler that provides predefined document types for including body text of a particular document type; or the services may even be provided by a grader that can be used to determine the overall writing quality of an input text. In a further aspect, the text string input by the user may be in English; the bilingual dictionary service may be an English-Chinese dictionary service configured to provide definitions in Chinese for a word or phrase in English; the spell checking service may be configured to detect erroneous spellings of an English word and provide its correct spelling; the translation service may be configured to translate between English and Chinese; the thesaurus service may be configured to return synonyms and antonyms of an English word.

In yet another aspect, at least one of the text assistance services is provided by a server that is remote from the client.

Other embodiments of each of these aspects may include corresponding systems, apparatus, and computer programs recorded on computer storage devices, each configured to perform the actions of methods.

The details of one or more embodiments are set forth in the accompanying drawings and the description below. Other features, objects and advantages will be apparent from the description and drawings, and from the claims.

BRIEF DESCRIPTION OF THE DRAWINGS

Like reference symbols in the various drawings indicate like elements.

DETAILED DESCRIPTION

Figure 2:
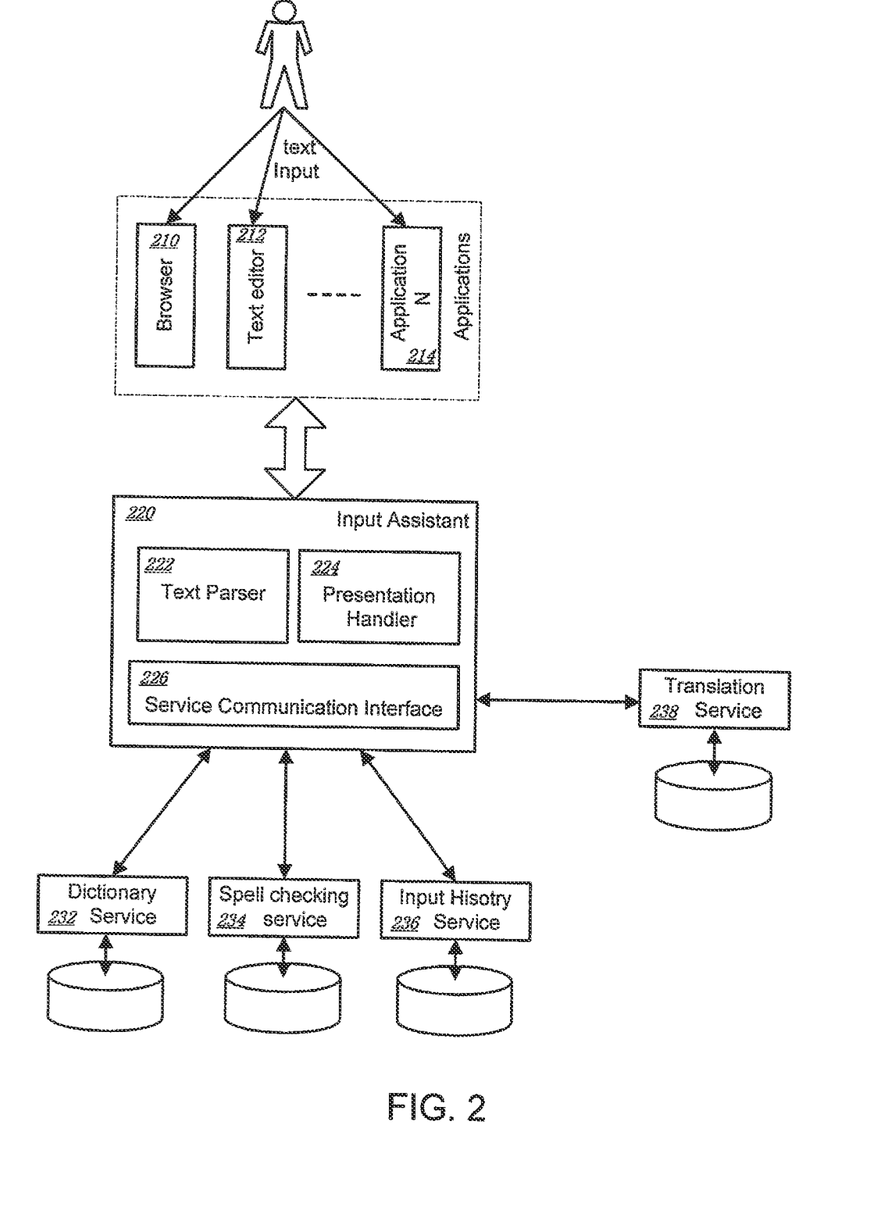
FIG. 2 is a diagram of a system for facilitating text input according to some implementations of the present disclosure.

FIG. 2 is a diagram of a system for facilitating text input. In this example implementation of the system, a variety of different applications is installed in an operating system of a computer. These applications, such as a web browser 210, or a text editor 212, etc., each include at least a field for a user to input text content during the users interaction with the applications. Each application may already have some internal text input assistance features, such as a spell-checker, that can provide text input assistance when the user is typing some text in a certain language, such as English, in a specific input field in the application.

These applications, regardless of whether they have their own text input assistance capability, are configured to, under the management of the operating system, invoke an external Input Method Editors (IME) or an input assistant residing under the same operating system environment. The invocation can be caused by, for example, the pressing a specific combination of keys, such as "ctrl+space", when the focus is in the input field of the application, such as when the cursor is flickering in the input field. The invoked IME or external input assistant can provide a set of uniform input assistant features for any invoking applications that may cover a much broader range of functionalities than those provided by the input assistant features internal to the invoking applications themselves.

In the system of FIG. 2, the input assistant 220 operates in the same operating system environment as the various applications 210-214. The input assistant comprises, in this example, three modules: a text parser 222, a presentation handler 224 and a service communication interface 226. The text parser 222 is configured to receive text input in the form of a text string from an input field of an application, perform a preliminary parsing on this received text string, determine which input assistance services are appropriate to handle the request of this input string, and send the text string to the relevant services via the service communication interface 226 for detailed text assistance information. The presentation handler 224 is configured to process and present the results received from the input assistant services in an appropriate form, such as scoring and ranking each item in the results from different services according to their relevance to the input string, and display the items according to the ranking in a popup menu for viewing by the user. Further, the handler 224 can also receive navigation commands or selections from the user to commit a particular item in the list to the input field in the application or exiting the popup menu or a sub-menu.

The service communication interface 226 is configured to communicate with various input assistance services that may be implemented in the same computer as the input assistant 220 and the invoking applications 210-214, or may be implemented in a remote server. The interface 226 dispatches the parsed string received from the input field of the application to the appropriate services and waits for the results from these services. Once the results are received, the interface 226 sends these results to the presentation handler 224 for presentation processing and display on the client device in the invoking application.

A plurality of different text assistance services 232-238 may be available to the input assistant 220. Based on the nature of processing complexity, some or even all of the input assistance services 232-238 may reside in the same operating system environment as the input assistant 220, and may be, in some implementations, integrated with the input assistant 220 as one product for easy deployment and management under the operating system. Some other input assistance services may reside remote from the computer in which the invoking application and the input assistant 220 are running. The input assistant 220 can, through the service communication interface 226, communicate with such services via the Internet or other dedicated networks according to standard protocols, such as a call to a web service via Simple Object Access Protocol (SOAP). To ensure privacy, such communications may be implemented using privacy protection techniques and/or encryption protocols.

Figure 3:
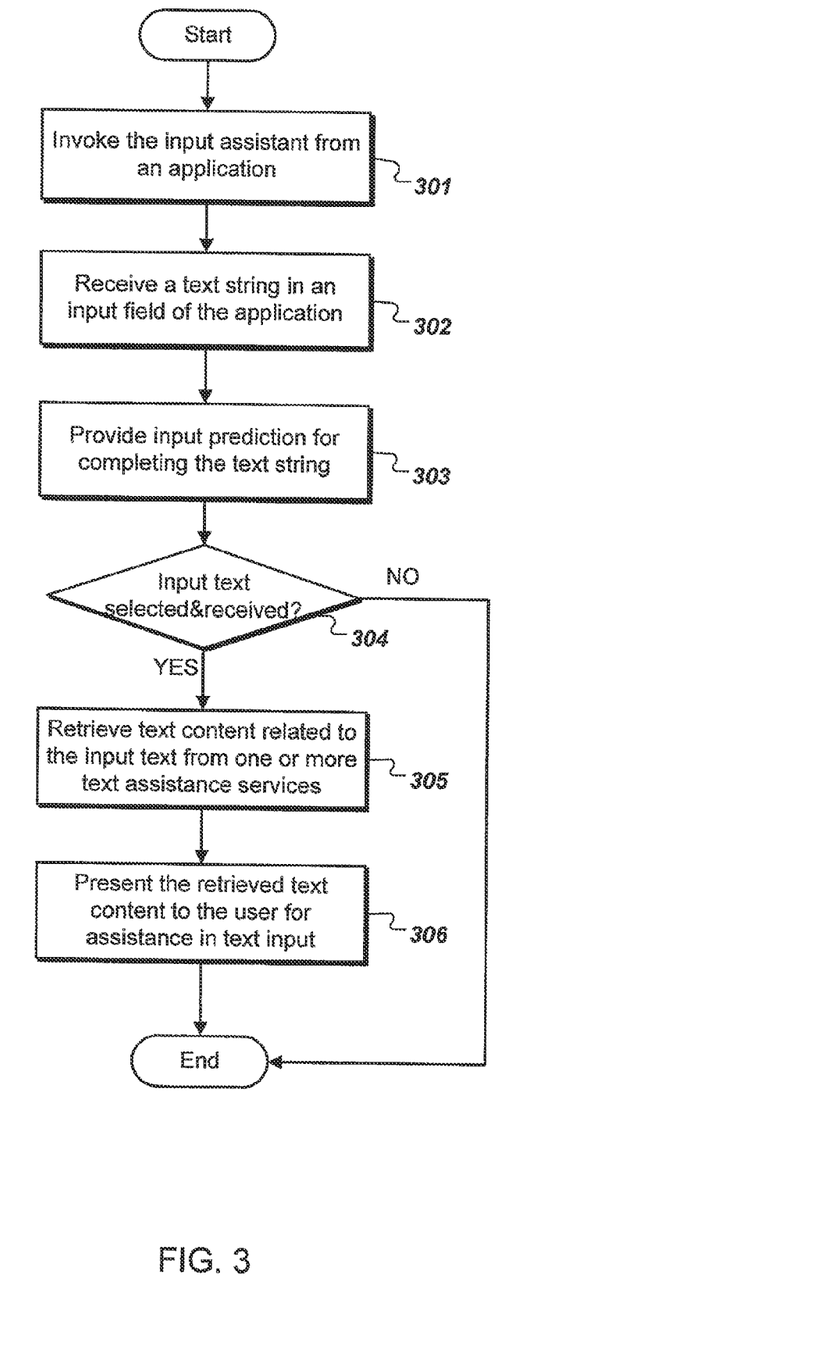
FIG. 3 is a flowchart illustrating a process of facilitating text input.

FIG. 3 is a flowchart illustrating a process of facilitating text input. The process of FIG. 3 can be implemented in the input assistant 220 of FIG. 2. At step 301, an input assistant 220 is invoked in an application. The application in this case can be, for example, a word processing application, an instant messenger, or simply a web page with a text input opened by a specific browser, such as Google chrome or other browsers, or any other applications that, at a certain step in its interaction with a user, requires text input from the user. For ease of reference, the generic term "application", instead of any specific application, is hereafter used to refer to such applications that have input fields for receiving text input from the user during their interaction with the user. The application may already have its own input assistance features, such as a word processing program that provides spelling checking, grammar checking, a thesaurus for finding synonyms and antonyms, etc. In using such an application, the user can choose to use these input assistance features internal to the application itself, or decide to use external resources such as the one provided by the systems described herein through an invocation of the input assistant 220 from within the application.

In some implementations, after the input field the user is currently working on has become the object of focus, e.g., when the cursor is in the input field and flickering, showing that the input field is ready to receive input text, the user can proceed to invoke the input assistant 220 by keying in a combination of keys, such as "Ctrl+space" or "Ctrl+Shift+space", etc. The exact combination of the keys for invoking the input assistant 220 can be custom configured in the operating system environment. For example, the input assistant 220 is a service residing in the same operating system environment on the same computer as the application, and both the input assistant 220 and the application are being managed by the same operating system on this computer.

Invoking the external input assistant 220 need not automatically suppress any internal input assistance features in the application due to their different triggering settings. For example, in a particular word processing program, checking on spelling and grammar can be automatically done on the entire text already input in the input field by a background process, and finding synonyms or antonyms can be done by selecting the target word and pressing "Shift+F7"; with the input assistant 220 invoked, as long as the mechanism for calling up the input assistant 220 to process a particular input string is different from the above triggering mechanism, the user can always have the choice of calling up either the internal or external input assistance features to improve his text input experience.

After the input assistant 220 has been invoked in the application and the input field receives text input from the user, input assistance will be available to the user from the external input assistant 220. For example, the user may input the following string into the input field, "Wikipedia is a free, multili" (step 302). Thereafter, the user may stop at this point to think about how the word the user intends to input is spelled.

In some implementations, the input assistant 220 can be automatically triggered if it determines that there is no activity from the user since the input of the last character for a pre-determined period of time, such as two seconds. In some implementations, the input assistant 220 will be triggered only if the pre-determined period of time has expired and the text already input is at least of a certain threshold length, for example, four characters. Upon triggering, the input assistant 220 will read the string of text from where the cursor is located back to the next space. In the above example, the string "multili" will be read as the input string and sent to the input assistant 220 for further processing.

Alternatively, the user may have moved the cursor from the end of the string he has input to the middle or right in front of the first letter of the uncompleted word. For example, the cursor may be located between the letter "l" and "t" in the string "muffin", or right in front of the letter "m". The user may further use a key combination, such as "Ctrl+'\'", to trigger the input assistant 220. In this case, the input assistant 220 can read the consecutive character string before and after the cursor, that is, without any space in between, and similarly take the character string "multili" as the input string to the input assistant 220. Further, if a user has inadvertently typed one or more spaces after the string "multili", the input assistant 220 can be configured to skip these spaces and read back until the next space, thus still obtaining the string "multili" as the input string to the input assistant 220. Thus, the system can read from the input text the last input word or word fragment, either of which may be spelled correctly or incorrectly.

Once the input string is obtained, the input assistant 220 passes this input string to a dictionary service 232 via the service communication interface 226 to obtain any possible words that start with the string "multili". In this case, the text parser 222 of the input assistant is not required to involve itself with the parsing on the input string since, for the purpose of providing input suggestion for completing the word starting with this character string, the string "muffin" is passed as it is and the target service is definite (or the target service is determined with a minimum degree of confidence), i.e., a dictionary service for a word or word fragment. Upon receiving the string "multili", the dictionary service 232, which can be a digital dictionary product incorporated in the input assistant 220 itself or an online dictionary service accessible via the Internet, retrieves from its data store any words that start with the character string "multili", sorts them according to its own ranking criteria, and exports the results to the presentation handler 224 of the input assistant 220 via the service communication interface 226 for presenting to the user. The presentation handler 224, upon receiving the list of predicted words, prepares a popup menu and displays the popup menu and the words adjacent to the input field of the application (step 303). For some users, the function of auto-completion may not be necessary. In this case, the step 303 as shown in FIG. 3 can be skipped and the input assistant 220 can proceed to provide the assistance as described in steps 304-306.

Figure 4A:
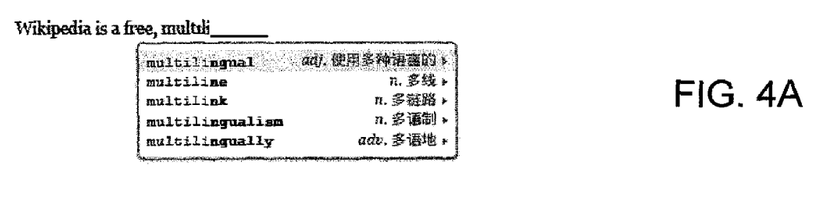
FIG. 4A-4C are examples of generated input suggestions.

The list of predicted words can be presented with their basic meanings. In some implementations, the basic meanings are in a different language. FIG. 4A is an example menu of the list of predicted words, with their basic meanings in Chinese shown after each word for easy understanding by a user whose native language is Chinese. In this example, the first predicted word "multilingual" is selected by default. The string "lingual" is already temporarily input into the input field to complete the word "multilingual", with the predicted part "ngual" being in a shaded color, or underlined or accented in any other distinctive way to show that this is just a suggested input and not a final input in the input field. If the user determines that the word "multilingual" is what the user intends to input, the user can commit the input of the complete word "multilingual" by pressing on the space bar or the "return" key, for example. If this word is not what the user intends, the user can select other word in the list by scrolling up or down to the intended word using the up and down arrow keys. In some implementations, while scrolling, the selected word will be temporarily auto-completed in the input field in the same way as with the case of the default selection on the word "multilingual".

Figure 4B:
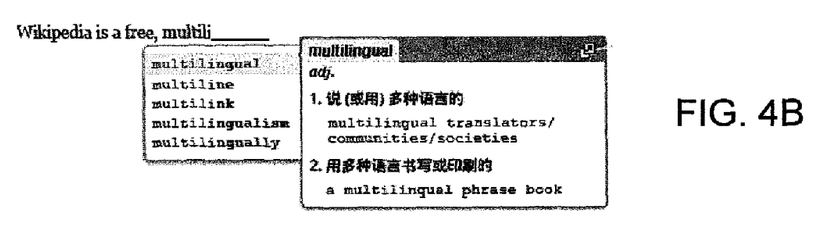
Figure 4C:
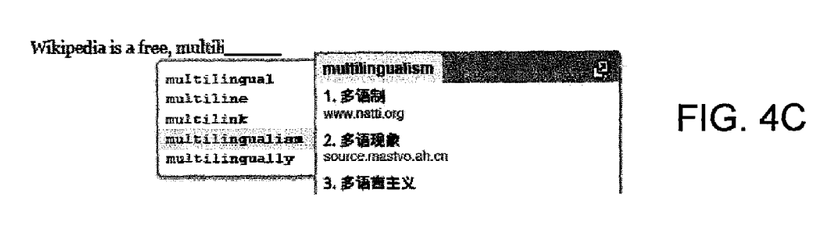

To further assist a user of non-English speaker in understanding the usage of an English word, the dictionary service 232 can further provide more detailed explanations on each meaning of the word and sample sentences in the source language (i.e., the language of the word to be input) for each such usage. In the above case, definitions of a word can be rendered in a separate window by the presentation handler 224. In FIG. 4B, the detailed meanings in Chinese and the corresponding sample sentences in English for the word "multilingual" are rendered in a sub-window, which is triggered by pressing the right arrow key when the word "multilingual" is selected as in FIG. 4A. The dictionary service 232 can further provide a URL link to a web page for each particular meaning or translation of a word for further reference if the user wishes to visit that web page, as demonstrated in FIG. 4C, wherein different translations of the term "mutilingualism" are provided in a sub-window.

Besides the function of predicting the remaining part of a word, i.e., the functionality of auto-completion at the word level, the input assistant 220 can be more versatile in assisting a non-native speaker of the input language in obtaining information related to the input text, or providing input hints from the user's previous input history.

In some implementations, a spell checking service can be offered to check the spelling of the input word or words. In the above case with the auto-completion function, if the input assistant 220 determines that no predicted words are available from the dictionary service 232 for the input string, for example in the case where the input string is "multtpl", the input assistant 220 may determine that the user may not be requesting the auto-completion service by waiting for the predetermined time, but instead may be requesting a service for spell-checking the input string (or may not be able to use the auto-complete service without the spell-checking service). The input assistant will forward the input string "multtpl" to the spell checking service 234 to obtain possible correct spellings of this word. The spell checking service, similar to the dictionary service 232, can be a service integrated with the input assistant 220 on the local computer or a remote service accessible via the Internet. Each result from the spell checking service 234 is scored and ranked according to its relevance to the input string. Upon receiving these results, the presentation handler 224 presents these results in a similar manner as with the results from the dictionary service 232 for review and selection by the user.

After the user finishes reviewing the results from the dictionary service 232 or the spell checking service 234 and made his choice, he may proceed to typing in additional content after his selection. In this case, the input assistant 220 will wait for the next call from the user, either through the cursor being inactive for another predetermined period of time at a new location, or through a voluntary call to the input assistant 220 from the user by a manual selection of an input string, and then send the text string to the input assistant 220. The step of activating the input assistant 220 for prediction of a complete word or performing spelling checking on the input string simply by waiting for a predetermined time is optional. The user may directly activate the input assistant 220 for input assistance, as described in detail below.

Apart from triggering the input assistant 220 simply by waiting a pre-determined time for auto-completion or spelling checking purposes, the input assistant 220 can be further manually or automatically triggered for more advanced services. In some implementations, the user can manually select a word or string of consecutive characters using the mouse or combination of keys, such as the key "Shift" plus the arrow keys, and trigger the input assistant 220 by pressing another combination of keys, such as "Ctrl+'\'" (step 304). In an alternative implementation, the selection of one or more words from the input field can be automatically performed by the input assistant 220 when the user triggers the input assistant 220 by pressing "Ctrl+'\'" without first manually selecting any input text. In this case, the input assistant 220 may check the text surrounding the cursor and select, for example, the previous partial one or several words starting from where the curser is located as the input text for invoking an input assistance service. In an alternative implementation, if the user has pressed "Ctrl+'\'" twice within a short period, for example one second, the input assistant 220 may select the entire sentence surrounding the cursor as the input text.

Upon receiving an input string from the input field that was manually selected by the user or automatically selected by the input assistant 220, the text parser 222 of the input assistant 220 will first perform a preliminary parsing process on the input string. In some implementations, the text parser 222 first determines the language of the input string. For example, if the input string is a string of characters "兰花", the text parser may determine that it is in Chinese. In the case of a Chinese input, as it is very likely that a user who is unfamiliar with English words is requesting the corresponding English word of this Chinese text, the text parser 222 will forward this Chinese text to the dictionary service 232 for the corresponding word or meaning in English. The dictionary service 232 will, in this case, return the term "orchid" to the input assistant 220 for appropriate presentation to the user by the presentation handler 224.

Conversely, if the input string is "wikipedia is a free, multilingual encyclopedia project", the text parser 222 will determine that the input text is in English. Further, the text parser 222 will determine that there is more than one word in this input string from the text of the string, by simply identifying at least a space in the input string. In this case, it is assumed that the user does not simply want to check for the meaning of a word or words in the input string, but instead wants to check for the meaning of a phrase or a sentence.

In some implementations, this input string may be forwarded to a translation service, which may be located remote from the computer where the input assistant 220 resides, and obtain a translation of the input string in Chinese to present to the user for his reference in confirming that the word the user has input is largely correct in English. The text parser 222 can also send this input string to a grammar service that checks the English grammar of the input string, and obtain the results in the form of suggested improvements or simply highlighting the problematic parts in the input string. The above translation and grammar checking processes can be carried out simultaneously (step 305), and the results from both services can be aggregated in one list for presentation to the user (step 306).

Different rules or standards can be set in the text parser 222 for determining which services should be called for a particular input string. The rules or standard can define the selection of services based on detected characteristics of various languages (e.g., spaces, no spaces, number of consecutive characters, etc.). For example, an input string comprising more than 10 non-consecutive spaces should be forwarded to the spelling checking service and translation service only, and an input string comprising less than three nonconsecutive spaces should be forwarded to the dictionary service 232, the spell checking service 234, the input history service 236, etc. Additional functions can be further implemented in the text parser 222 in its preliminary parsing stage to better determine which services would be appropriate to handle the received input string in providing the best possible results or combination of results for improving the user's text input experience. Alternatively, instead of always being determined by the text parser 222, a particular input assistance service may be manually designated and triggered by the user for a particular input string, by simply typing in a specific combination of keys, or invoking a functional GUI window in the input assistant 220 to select the appropriate service for processing the particular input string.

As a further alternative, the text parser 222 does not need to make the determination, but forwards the request to all the input assistance services connected with the input assistant 220. Each input assistance service will determine if the received input text is appropriate for it to provide a result. The determination can be made, for example, by reference to rules or conditions that define when text is appropriate for processing by each particular service. For example, if a translation service finds that the received text is in the target language, it will return a null value to the requesting input assistant 220. The presentation handler 224 of the input assistant 220 will then reassemble the results from different services while skipping any null values for presenting to the user.

In some implementations, an input history service 236 can be used to provide user specific input history to assist the user in inputting large portions of content that the user may often use in specific contexts. For example, a patent attorney may use many fixed expressions in responding to office actions. In this case, the user may have a user account with the input assistant 220, in which the user may call up the input assistant 220 to configure the setting according to his preferences and store often used expressions for future usage in the account with the input history service 236. The input history service can be located in a central server, which allows the user to log into the account from different computers with the input assistant 220 and still have the benefits of enjoying his preferred configuration in the input assistant 220 and using the user's own input history in assisting the input experience. Storing custom content in a central service and retrieving them whenever required from anywhere through the use of user accounts are feasible in the field.

Figure 5A:
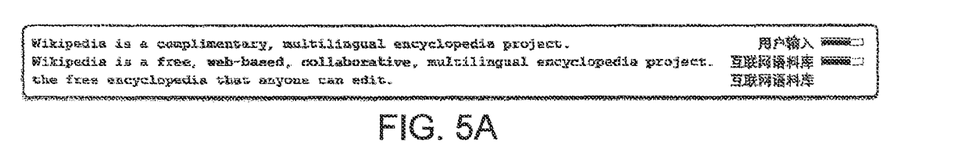
FIGS. 5A-5D illustrate different types of examples for providing conjugated suggestions to assist the inputting of text by the user.

FIG. 5A is a sample display of an item retrieved from a user's input history. In this example, the first item "Wikipedia is a complimentary, multilingual encyclopedia project" is a prediction result of an input string "wikipedia is" and retrieved from the user's past input. The other two items in this example are relevant sentences retrieved from a corpus of web content, which can be an independent service coupled to the input assistant 220, providing phrases, sentences or even paragraphs based on an input string.

In some implementations, results from different services can be rendered in a single popup window for the user to choose from. The presentation handler 224 can sort the results from each service according to any known ranking criteria that at least include a weighted ranking of each result item from each service to thereby reflect the relevance of each result item to the input string. In some implementations, the presentation handler joins the results from different services in one display window for presentation. In the above example in FIG. 5A, the three items in the list are from two different services. The presentation handler 224 joins the first result from the input history service 236 with the other two items from the corpus of web content together in one window for display.

Figure 5B:
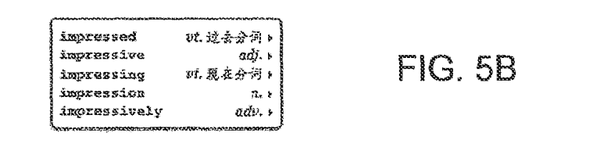
Figure 5C:
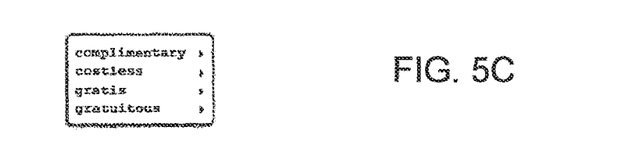
Figure 5D:
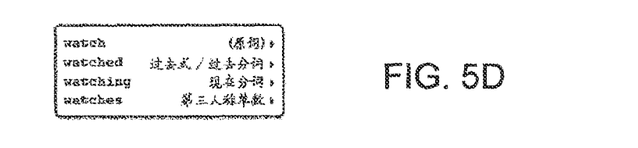

In some implementations, the dictionary service 232 can present alternative results of particular category to the user for a review. These different results can be displayed in response to different user inputs, e.g., different keyboard invocation commands. For example, in FIG. 5B, different forms of an input string of a word stem "impress" are presented, and their parts of speech, word class, etc., are also explained after each word as a prediction result. In FIG. 5C, a thesaurus sub-service in the dictionary service provides the synonyms of an input word "free". In FIG. 5D, only the different reflective forms of the verb "watch" are presented, with each item followed by an explanation of its particular part of speech in Chinese for easy understanding by an English user whose native language is Chinese.

Services that assist the user in his text input experiences are not limited to the above. Other services that provide assistance with other languages, or with additional input assistance or text prediction functionalities, can also be integrated with or connected to the input assistant 220 to provide additional input assistance to the user. For example, a service may provide the function of filling in one or more lost words in an input string, which in whole constitutes a commonly used phrase, such as an input string "a of" may return a prediction of the phrase "a lot of". Also, the different definitions of the key presses or combinations of key presses in this disclosure are for exemplary purposes only; many different combinations may be defined in different operating systems to achieve the same effects of triggering a service or handling the popup windows.

Embodiments of the subject matter and the functional operations described in this specification may be implemented in digital electronic circuitry, in tangibly-embodied computer software or firmware, in hardware, including the structures disclosed in this specification and their structural equivalents, or in combinations of one or more of them. Embodiments of the subject matter described in this specification may be implemented as one or more computer programs, i.e., one or more modules of computer program instructions encoded on a computer storage medium for execution by, or to control the operation of, data processing apparatus. Alternatively or in addition, the program instructions may be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium may be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, at a computing device including one or more processors, a text string from a user via an application executing at the computing device;
selecting, at the computing device, at least a portion of the text string to obtain an input text;
determining, at the computing device, which of a plurality of text assistance services are appropriate to provide assistance to the user with respect to the input text to obtain one or more selected text assistance services by:
  (i) determining a degree of confidence for each of the plurality of text assistance services indicative of a degree of appropriateness for a specific text assistance service, and
  (ii) selecting each text assistance service having a degree of confidence greater than or equal to a minimum degree of confidence to obtain the one or more selected text assistance services,
wherein each text assistance service is configured to provide the user with a different type of assistance with respect to the input text, and wherein each text assistance service has different rules or standards defining its selection based on detected characteristics of various languages, wherein at least one of the plurality of text assistance services is internal to the application and located at the computing device and wherein at least one of the plurality of text assistance services is located at a server located remotely from the computing device;
obtaining, at the computing device, a text content from each of the one or more selected text assistance services, each text content representing information to assist the user with respect to the input text;
sorting, at the computing device, the text content from each of the one or more text assistance services according to a weighted ranking criteria reflecting a relevance of each text content with respect to the input text to obtain sorted text content; and
outputting, at the computing device, the sorted text content in a single window at the computing device.

2. A computer-implemented method, comprising:
receiving, at a computing device including one or more processors, a text string from a user via an application executing at the computing device;
selecting, at the computing device, at least a portion of the text string to obtain an input text;
determining, at the computing device, which of a plurality of text assistance services are appropriate to provide assistance to the user with respect to the input text to obtain one or more selected text assistance services, wherein each text assistance service is configured to provide the user with a different type of assistance with respect to the input text, wherein each text assistance service has different rules or standards defining its selection based on detected characteristics of various languages, and wherein obtaining the one or more selected text assistance services is automatically performed after both (i) a predetermined period of inactivity by the user and (ii) a length of the text string is greater than a predetermined length;
obtaining, at the computing device, a text content from each of the one or more selected text assistance services, each text content representing information to assist the user with respect to the input text; and
outputting, at the computing device, the text content from each of the one or more selected text assistance services.

3. The computer-implemented method of claim 2, wherein the rules or standards for a specific text assistance service include a number of non-consecutive spaces in the text string.

4. The computer-implemented method of claim 2, wherein determining the one or more selected text assistance services and obtaining text content from the one or more selected text assistance services includes:
providing, by the computing device, the input text to each of the plurality of text assistance services, the input text causing each of the plurality of text assistance services to determine whether it is appropriate to provide assistance to the user with respect to the input text; and
receiving, at the computing device, a response from each of the plurality of text assistance services including either a specific text content when a specific text assistance service determined that it is appropriate to provide assistance to the user with respect to the input text or a null value when the specific text assistance service determined that it is not appropriate to provide assistance to the user with respect to the input text.

5. The computer-implemented method of claim 2, wherein determining which of the plurality of text assistance services are appropriate to provide assistance to the user with respect to the text input includes:
determining, at the computing device, a degree of confidence for each of the plurality of text assistance services indicative of a degree of appropriateness for a specific text assistance service; and
selecting, at the computing device, each text assistance service having a degree of confidence greater than or equal to a minimum degree of confidence to obtain the one or more selected text assistance services.

6. The computer-implemented method of claim 2, wherein the text content from each of the one or more text assistance services is output in a single window at the computing device.

7. The computer-implemented method of claim 6, wherein outputting the text content from each of the one or more text assistance services in the single window includes:
sorting, at the computing device, the text content from each of the one or more text assistance services according to a weighted ranking criteria reflecting a relevance of each text content with respect to the text string to obtain sorted text content; and
outputting, at the computing device, the sorted text content in the single window.

8. The computer-implemented method of claim 2, wherein at least one of the plurality of text assistance services is located at a server located remotely from the computing device.

9. The computer-implemented method of claim 2, wherein at least one of the plurality of text assistance services is internal to the application and located at the computing device and wherein at least one of the plurality of text assistance services is located at a server located remotely from the computing device.

10. The computer-implemented method of claim 9, wherein the at least one internal text assistance service is configured to automatically operate as a background process when the one or more selected text assistance services are each located at one or more servers located remotely from the computing device.

11. A computing device including one or more processors configured to execute instructions that cause the computing device to perform operations comprising:
receiving a text string from a user via an application executing at the computing device;
selecting at least a portion of the text string to obtain an input text;
determining which of a plurality of text assistance services are appropriate to provide assistance to the user with respect to the input text to obtain one or more selected text assistance services, wherein each text assistance service is configured to provide the user with a different type of assistance with respect to the input text, wherein each text assistance service has different rules or standards defining its selection based on detected characteristics of various languages, and wherein obtaining the one or more selected text assistance services is automatically performed after both (i) a predetermined period of inactivity by the user and (ii) a length of the text string is greater than a predetermined length;
obtaining a text content from each of the one or more selected text assistance services, each text content representing information to assist the user with respect to the input text; and
outputting the text content from each of the one or more selected text assistance services.

12. The computing device of claim 11, wherein the rules or standards for a specific text assistance service include a number of non-consecutive spaces in the text string.

13. The computing device of claim 11, wherein determining the one or more selected text assistance services and obtaining text content from the one or more selected text assistance services includes:
providing the input text to each of the plurality of text assistance services, the input text causing each of the plurality of text assistance services to determine whether it is appropriate to provide assistance to the user with respect to the input text; and
receiving a response from each of the plurality of text assistance services including either a specific text content when a specific text assistance service determined that it is appropriate to provide assistance to the user with respect to the input text or a null value when the specific text assistance service determined that it is not appropriate to provide assistance to the user with respect to the input text.

14. The computing device of claim 11, wherein determining which of the plurality of text assistance services are appropriate to provide assistance to the user with respect to the text input includes:
determining a degree of confidence for each of the plurality of text assistance services indicative of a degree of appropriateness for a specific text assistance service; and
selecting each text assistance service having a degree of confidence greater than or equal to a minimum degree of confidence to obtain the one or more selected text assistance services.

15. The computing device of claim 11, wherein the text content from each of the one or more text assistance services is output in a single window at the computing device.

16. The computing device of claim 15, wherein outputting the text content from each of the one or more text assistance services in the single window includes:
sorting the text content from each of the one or more text assistance services according to a weighted ranking criteria reflecting a relevance of each text content with respect to the input text to obtain sorted text content; and
outputting the sorted text content in the single window.

17. The computing device of claim 11, wherein at least one of the plurality of text assistance services is internal to the application and located at the computing device and wherein at least one of the plurality of text assistance services is located at a server located remotely from the computing device.

18. The computing device of claim 17, wherein the at least one internal text assistance service is configured to automatically operate as a background process when the one or more selected text assistance services are each located at one or more servers located remotely from the computing device.

* * * * *